United States Patent [19]
Takahashi et al.

[11] Patent Number: 5,346,932
[45] Date of Patent: Sep. 13, 1994

[54] SILICONE RUBBER COMPOSITION AND METHOD FOR CURING THE SAME

[75] Inventors: Masaharu Takahashi, Gunma; Jun Hatakeyama, Ibaraki, both of Japan

[73] Assignee: Shin-Etsu Chemical Co., Ltd., Tokyo, Japan

[21] Appl. No.: 932,138

[22] Filed: Aug. 19, 1992

Related U.S. Application Data

[63] Continuation-in-part of Ser. No. 654,428, Jan. 25, 1991, abandoned.

[30] Foreign Application Priority Data

Jan. 26, 1990 [JP] Japan .................................... 2-17081

[51] Int. Cl.$^5$ .................. C08K 9/06; C08L 83/00; B29C 35/08
[52] U.S. Cl. .................. 523/213; 523/212; 524/588; 524/493; 524/262; 524/263; 524/268; 264/26; 264/25; 264/DIG. 46
[58] Field of Search ............... 523/212, 213, 137; 524/588, 493, 262, 263, 268; 264/26, 25, DIG. 46

[56] References Cited

U.S. PATENT DOCUMENTS

| | | | |
|---|---|---|---|
| 3,355,406 | 11/1967 | Cekada | 524/263 |
| 4,011,197 | 3/1977 | Lee | 264/26 |
| 4,273,634 | 6/1981 | Saam et al. | 524/588 |
| 4,391,765 | 7/1983 | Lee et al. | 264/26 |
| 4,469,522 | 9/1984 | Matsumoto | 523/213 |
| 4,499,036 | 2/1985 | Hawkes, Jr. | 264/26 |
| 4,500,659 | 2/1985 | Kroupa et al. | 524/862 |
| 4,529,774 | 7/1985 | Evans et al. | 523/217 |
| 4,863,985 | 9/1989 | Pouchol et al. | 524/437 |
| 4,985,477 | 1/1991 | Collins et al. | 523/213 |
| 4,996,257 | 2/1991 | Saito et al. | 524/262 |

*Primary Examiner*—Melvyn I. Marquis
*Assistant Examiner*—Karen A. Dean
*Attorney, Agent, or Firm*—Millen, White, Zelano, & Branigan

[57] ABSTRACT

The invention provides a silicone rubber composition which is efficiently curable by exposure to microwaves but, different from conventional microwave-curable silicone rubber compositions compounded with a deep-colored energy-absorbing agent, is still capable of being colored in any desired color because the energy-absorbing agent compounded therein is not colored. The energy-absorbing agent used here is a silica or polyorganosilsesquioxane powder having cyanoalkyl or fluoroalkyl groups bonded to the silicon atoms.

21 Claims, No Drawings

SILICONE RUBBER COMPOSITION AND METHOD FOR CURING THE SAME

BACKGROUND OF THE INVENTION

This is a continuation-in-part application from a copending U.S. patent application Ser. No. 07/654,428 filed Jan. 25, 1991, now abandoned.

The present invention relates to a silicone rubber composition and a method for curing the same into a cured silicone rubber body. More particularly, the invention relates to a silicone rubber composition capable of being efficiently cured by exposure to ultra-high-frequency electromagnetic waves as well as a method for obtaining a cured silicone rubber from the silicone rubber composition.

It is sometimes desired to produce a continuous-length body of a cured silicone rubber from a curable silicone rubber composition by extrusion molding or other continuous-molding process followed by an also continuous curing process such as the normal-pressure hot-air vulcanization, continuous steaming vulcanization, molten-salt vulcanization and the like. These continuous curing methods, however, are not always quite satisfactory due to one or more problems inherent therein.

Apart from silicone rubbers, the demand for various forms of continuous-length cured rubber bodies is rapidly growing in the applications, for example, to rubber gaskets in buildings, rubber tubes, rubber rollers and the like. To comply with this growing demand, several types of organic rubbers, such as ethylene-propylene-diene terpolymeric rubbers, polychloroprene rubbers and the like, are fabricated into a continuous-length body by the extrusion molding of the rubber composition followed by curing of the extruded body by exposure to or irradiation with ultrahigh-frequency electromagnetic waves or so-called microwaves. Although the above mentioned curing method by exposure to ultra-high frequency waves, referred to as the UHF curing method hereinbelow, is successful for the above named organic rubbers, the method is hardly applicable to ordinary silicone rubber compositions due to the low loss index of silicone rubbers which means that the efficiency of absorption of the energy of UHF waves by the silicone rubber is not high enough to ensure rapid curing of the composition.

To explain the problem in more detail, the method of UHF curing is performed usually by using UHF electromagnetic waves or so-called microwaves of a frequency of 2450±50 MHz or 915±25 MHz in view of the statutory regulation and the rubber composition as molded absorbs the energy of the microwaves to be heated up to a temperature at which the composition is curable. When microwaves having energy P are introduced into an oven for UHF curing containing a dielectric body having a dielectric loss factor of $\epsilon\cdot\tan\delta$, the following equation is held:

$$P = (5/9) f \cdot E^2 \cdot \epsilon \cdot \tan \delta \times 10^{10},$$

in which P is the heat evolved in watts/m³, f is the frequency of the microwaves in hertz, E is the electric field of the microwaves in volts/meter, $\epsilon$ is the dielectric constant of the material and $\tan\delta$ is the dielectric loss factor.

It is generally accepted that the method of UHF curing of a rubber stock can be successful only when the dielectric loss index, i.e. $\epsilon\cdot\tan\delta$, of the rubber composition is 0.08 or larger or, preferably, 0.2 or larger since otherwise no sufficient heat evolution can be obtained in the rubber stock irradiated with the microwaves. This is the principal reason for the inapplicability of the UHF curing method to conventional silicone rubber compositions having a loss index of only about 0.03 at a frequency of 3000 MHz.

Accordingly, there have been made several proposals and attempts in order to successfully cure a silicone rubber composition by the UHF curing method. For example, Japanese Patent Kokai 52-37963 proposes a UHF-curable silicone rubber composition of which the conventional monovalent aliphatic hydrocarbon groups bonded to the silicon atoms in the organopolysiloxane as the principal ingredient of the composition are replaced with aryl groups, chlorinated or fluorinated aliphatic hydrocarbon groups, hydrocarbon groups substituted with a mercapto group or aliphatic hydrocarbon groups having a hydroxymethyl group or an oxyalkylene linkage. Such a silicone rubber composition indeed has somewhat improved curability by the UHF irradiation but is not free from disadvantages in practical applications in respect of the decrease in the heat resistance, weatherability, electric properties and surface characteristics inherent in cured silicone rubbers in general.

It is also proposed in the prior art that a silicone rubber composition is compounded with a powder of certain dielectric materials, e.g., ferrite powders, having high absorptivity of the energy of microwaves so that the silicone rubber composition can efficiently absorb the energy of microwaves and convert the energy into heat to obtain a temperature sufficiently high to cure the composition. A problem in this method is that the dielectric materials heretofore proposed in this purpose are deeply colored or black in color so that the silicone rubber composition compounded with a substantial amount of such a powder can hardly be colored in a lighter or aesthetically desirable color.

SUMMARY OF THE INVENTION

The present invention accordingly has an object to provide a novel silicone rubber composition which is curable by the method of UHF curing without the above described problems and disadvantages in the prior art relative to UHF-curable silicone rubber compositions, in particular, in relation to the problem of coloration in a light color.

The silicone rubber composition of the present invention curable by the method of UHF curing comprises, as a blend:

(a) 100 parts by weight of a diorganopolysiloxane represented by the average unit formula $$R_a SiO_{(4-a)/2}, \qquad (I)$$

in which R is an unsubstituted or substituted monovalent hydrocarbon group having 1 to 10 carbon atoms and a is a positive number in the range from 1.95 to 2.05, and having an average degree of polymerization in the range from 3,000 to 30,000;

(b) from 10 to 300 parts by weight of a finely divided silica filler substantially having a chemical formula of $SiO_2$;

(c) from 10 to 200 parts by weight of an organic-modified silica or polyorganosilsesqui-oxane powder having functional organic groups selected from the class consisting of cyanoalkyl groups, acryloxyalkyl groups, methacryloxyalkyl groups and fluoroalkyl groups or, preferably, cyanoalkyl groups and fluoroalkyl groups or, more preferably, cyanoalkyl groups bonded to the silicon atoms, the content of the functional organic groups being at least 0.3% by weight in the silica or polyorganosilsesquioxane powder; and (d) a curing agent in an amount sufficient to cure the composition when the composition is heated.

A cured silicone rubber body can be obtained by exposing the above defined silicone rubber composition to microwaves having a frequency in the range from 900 to 5000 MHz.

DETAILED DESCRIPTION OF THE PREFERRED EMBODIMENTS

As is described above, the most characteristic ingredient in the formulation of the inventive silicone rubber composition is the component (c), the other components being rather conventional. By virtue of this unique ingredient in the composition, the silicone rubber composition is readily cured when the composition is molded into a form and exposed to microwaves of a specified frequency. In addition, the component (c) is colorless or white in color so that the silicone rubber composition compounded therewith can be colored in any desired color tone even when the amount of the component (c) is substantial. This feature is advantageous as compared with conventional UHF-curable silicone rubber compositions prepared by compounding with a colored microwave-absorptive ingredient.

The component (a) in the inventive silicone rubber composition is a diorganopolysiloxane represented by the average unit formula (I) given above. In the formula, R is an unsubstituted or substituted monovalent hydrocarbon group having 1 to 10 or, preferably, 1 to 8 carbon atoms including alkyl groups such as methyl, ethyl, propyl and butyl groups, alkenyl groups such as vinyl, allyl and butenyl groups and aryl groups such as phenyl and tolyl groups as well as those substituted groups obtained by replacing a part or all of the hydrogen atoms in the above named hydrocarbon groups with halogen atoms, cyano groups and the like such as chloromethyl, 3-chloropropyl, 2-cyanoethyl and 3,3,3-trifluoropropyl groups. It is optional that the diorganopolysiloxane molecules have two kinds or more of these organic groups bonded to the silicon atoms in a molecule although it is preferable that at least 98% by moles of the organic groups denoted by R are alkyl groups of 1 to 4 carbon atoms or, in particular, methyl groups, the balance, if any, being vinyl, phenyl and/or 3,3,3-trifluoropropyl groups.

The subscript a in the average unit formula (I) is a positive number in the range from 1.95 to 2.05. This definition means that the diorganopolysiloxane should have a substantially linear molecular structure which may optionally include a branched structure to a limited extent. The diorganopolysiloxane as the component (a) should have an average degree of polymerization in the range from 3000 to 30000 or, preferably, from 4000 to 10000 in respect of the balance between the workability of the composition and the mechanical properties of the cured silicone rubber obtained from the composition.

The component (b) in the inventive silicone rubber composition is a finely divided silica filler substantially having a chemical formula of $SiO_2$ which serves for the purpose of control of the consistency and improvement of workability as well as extending of the composition and reinforcement of the cured silicone rubber. Any of known silica fillers can be used as the component (b) including fumed and precipitated silica fillers either without or with a surface treatment for hydrophobilization, fine quartz powders, diatomaceous earth and the like without particular limitations although the silica filler should have a specific surface area of at least 1 $m^2/g$ or, preferably, at least 50 $m^2/g$. The amount of the silica filler as the component (b) in the inventive silicone rubber composition is in the range from 10 to 300 parts by weight or, preferably, from 25 to 200 parts by weight per 100 parts by weight of the above described diorganopolysiloxane as the component (a). When the amount of the silica filler is too small, the reinforcing effect as desired cannot be obtained and the composition cannot be imparted with a consistency suitable for working as a matter of course. When the amount thereof is too large, on the other hand, great difficulties are encountered in the compounding work of a so large amount of the filler with the other components and, if a composition could ever be obtained, the composition is very poor in the workability such as moldability and extrudability and the silicone rubber body obtained by curing the composition would have poor mechanical properties.

The component (c) in the inventive silicone rubber composition is a finely divided silica powder or, preferably, a polyorganosilsesquioxane powder having specific organic groups bonded to the silicon atoms and serves as an absorber of the energy of microwaves to generate a quantity of heat sufficient to cause curing of the composition. The above mentioned specific organic groups bonded to the silicon atoms of the silica filler or polyorganosilsesquioxane include cyanoalkyl, acryloxyalkyl, methacryloxyalkyl and fluoroalkyl groups, of which cyanoalkyl groups and fluoroalkyl groups are preferred and cyanoalkyl groups are more preferred. The most important among the cyanoalkyl groups is 2-cyanoethyl group and the most important among the fluoroalkyl groups is 3,3,3-trifluoropropyl group from the practical standpoint.

Silica powders having these specific groups bonded to the silicon atoms and suitable as the component (c) can be prepared by the surface treatment of a conventional silica filler having silanolic hydroxy groups on the surface with a modification agent reactive with the silanol groups such as cyanoalkyl alkoxy silanes, e.g., 2cyanoethyl trimethoxy silane and 3-cyanopropyl triethoxy silane, (meth)acryloxyalkyl alkoxy silanes, e.g., 3-methacryloxypropyl trimethoxy silane, and fluoroalkyl alkoxy silanes, e.g., 3,3,3-trifluoropropyl trimethoxy silane. The procedure for the modification of a silica filler is disclosed, for example, in Japanese Patent Publication 48-15799.

The organopolysilsesquioxane powder having the above mentioned specific silicon-bonded groups and suitable as component (c) in the inventive silicone rubber composition can be obtained by the cohydrolysis and silanol-condensation of a mixture of trialkoxy silanes having one of the specific organic groups in a molecule, such as cyanoalkyl trialkoxy silanes, (meth)acryloxyalkyl trialkoxy silanes and fluoroalkyl trialkoxy silanes, with a methyl trialkoxy silane or a partial hydrolysis product thereof in an aqueous solution containing a hydroxide of an alkaline earth metal element, an alkali metal carbonate, an amine compound or ammonia followed by drying of the precipitates and disintegration of the dried precipitates to give spherical particles.

Alternatively, the polyorganosilsesquioxane powder can be prepared by the treatment of a conventional polymethylsilsesquioxane obtained by the hydrolysis and condensation of a methyl trialkoxy silane with a cyanoalkyl trialkoxy silane or fluoroalkyl trialkoxy silane to block the residual silanolic hydroxy groups on the surface of the polymethyl silsesquioxane particles.

It is sometimes advantageous that the above described procedures for the preparation of the silica or polyorganosilsesquioxane powder as the component (c) is performed by using a vinyl trialkoxy silane as the alkoxy silane compound used in the surface treatment or cohydrolysis so that a substantial amount of vinyl groups are introduced into the resulting silica or polyorganosilsesquioxane powder. Such a vinyl-containing silica or polyorganosilsesquioxane powder as the component (c) sometimes may contribute to the improvement of the mechanical properties and recoverability from compression of the cured silicone rubber body so that introduction of vinyl groups should be considered according to desire.

The silica or polyorganosilsesquioxane powder as the component (c) shoud contain the above mentioned specific organic groups in an amount of at least 0.3% by weight although the amount should be as large as possible in order that the energy-absorbing efficiency of the microwaves can be high enough. It is of course that no sufficient efficiency can be obtained when the amount of the specific organic groups in the component (c) is too small.

The specific silica or polyorganosilsesquioxane powder as the component (c) should be in-the form of a powder having an average particle diameter in the range from 0.1 to 50 µm. When the average particle diameter is too small, difficulties are encountered in the compounding work of a substantial amount of the component with the other components and the cured silicone rubber body obtained from the composition may have an unduly increased hardness. When the average particle diameter thereof is too large, on the other hand, a great decrease is caused in the mechanical properties of the cured silicone rubber body obtained by curing the silicone rubber composition.

The amount of the component (c), i.e. the specific silica powder, polyorganosilsesquioxane powder or combination thereof, in the inventive silicone rubber composition is in the range from 10 to 200 parts by weight or, preferably, from 25 to 100 parts by weight per 100 parts by weight of the diorganopolysiloxane as the component (a). When the amount thereof is too small, the absorbing efficiency of the energy of microwaves cannot be high enough. When the amount thereof is too large, on the other hand, an adverse influence may be caused on the physical properties of the cured silicone rubber body if not to mention the difficulty encountered in the compounding work of a so large amount of a powdery ingredient.

The component (d) compounded in the inventive silicone rubber composition is a curing agent which can be any of those known curing agents conventionally used for curing a silicone rubber composition. A typical class of the curing agent includes organic peroxide compounds exemplified by benzoyl peroxide, monochlorobenzoyl peroxide, 2,4-dichlorobenzoyl peroxide, 4-methyl benzoyl peroxide, tert-butyl perbenzoate, dicumyl peroxide, 2,5-bis(tert-butylperoxy)-2,5-dimethyl hexane, 2,5-bis(tert-butylperoxy)-2,5-dimethyl hexyne, peroxy dicarbonate compounds, e.g., dimyristylperoxy carbonate and dicyclododecylperoxydicarbonate, tert-butyl monoperoxy carbonate compounds and a compound expressed by the structural formula ROO—CO—O—CH$_2$—C(CH$_3$)$_2$—CH$_2$—O—CO—OOR, in which R is a monovalent hydrocarbon group having 3 to 10 carbon atoms. These organic peroxide compounds can be used either singly or as a combination of two kinds or more according to need. The amount of the organic peroxide compound as the component (d) in the inventive silicone rubber composition is in the range from 0.5 to 5 parts by weight per 100 parts by weight of the diorganopolysiloxane as the component (a).

Another class of the curing agent as the component (d) includes a combination of an organohydrogenpolysiloxane and a catalytic amount of a platinum compound, which can be used when the diorganopolysiloxane as the component (a) has at least two alkenyl or, in particular, vinyl groups bonded to the silicon atoms in a molecule. The organohydrogenpolysiloxane mentioned above, which serves as a crosslinking agent by the so-called hydrosilation reaction, is represented by the general average unit formula R$^2{}_b$H$_c$SiO$_{(4-b-c)/2}$, in which R$^2$ is a monovalent hydrocarbon group having 1 to 10 carbon atoms free from aliphatic unsaturation exemplified by alkyl groups such as methyl, ethyl, propyl and butyl groups and aryl groups such as phenyl and tolyl groups and the subscripts b and c are each a positive number with the proviso that b+c is in the range from 1.0 to 3.0 and a molecule of the organohydrogenpolysiloxane has at least two hydrogen atoms directly bonded to the silicon atoms. The organohydrogenpolysiloxane should preferably have an average degree of polymerization not exceeding 300 although the molecular structure thereof is not limited to a straightly linear structure but also can be cyclic or branched. The amount of the organohydrogenpolysiloxane should be sufficient to provide from 50% to 300% by moles of the siliconbonded hydrogen atoms based on the alkenyl groups in component (a). The platinum compound in combination with the organohydrogenpolysiloxane is a catalyst used to promote the hydrosilation reaction and can be selected from chloroplatinic acid, complexes of chloroplatinic acid with an olefin or vinyl-containing organopolysiloxane and alcohol solutions of chloroplatinic acid. The amount of the platinum compound added to the composition is in the range from 0.5 to 500 ppm by weight or, preferably, from 2 to 200 ppm by weight based on the amount of the diorganopolysiloxane as the component (a).

The silicone rubber composition of the present invention can be prepared by taking the above described components (a) to (d) each in a specified amount and uniformly blending them together. It is optional according to need that the inventive composition is further admixed with various kinds of known additives each in a limited amount including inorganic fillers other than silica fillers such as calcium silicate, calcium carbonate, carbon black and glass fibers, dispersing aids for the filler such as low-molecular organopolysiloxanes having a degree of polymerization not exceeding 100 and alkoxy group-containing organosilane compounds, heat-resistance improvers such as iron oxide, ceric oxide, iron octoate and titanium dioxide, pigments for coloring, flame-retardant agents such as palladium and platinum compounds and so on.

It is further optional, when a foamed body of the cured silicone rubber is desired, that the inventive silicone rubber composition is admixed with a blowing agent which is a compound stable at room temperature but decomposable at an elevated temperature to produce a foaming gas such as nitrogen, carbon dioxide and the like. Various kinds of known compounds suitable as blowing agents in rubber can be used here without particular limitations including azobisisobutyronitrile, dinitroso pentamethylene tetramine, benzene sulfone hydrazide, N,N'-dinitroso-N,N'-dimethyl terephthalamide, azodicarbonamide and the like. The amount of the blowing agent added to the inventive silicone rubber composition naturally depends on the desired extent of foaming or bulk density of the foamed silicone rubber body but it is usually in the range from 1 to 10 parts by weight or, in most cases, from 3 to 7 parts by weight per 100 parts by weight of the diorganopolysiloxane as the component (a). When adequately compounded with a blowing agent, the inventive silicone rubber composition gives a foamed and cured silicone rubber body of high expansion having a fine and uniform cellular structure.

The inventive silicone rubber composition obtained in the above described manner can of course be molded and cured by any conventional curing method used in the preparation of cured silicone rubber articles including compression molding, normal-pressure hot-air vulcanization, steam vulcanization, transfer molding, injection molding and the like. By virtue of the unique component (c) compounded in the composition, moreover, the inventive silicone rubber composition can be successfully cured by the method of UHF curing when a molded and shaped body of the composition is exposed to microwaves by the absorption of the energy of the microwaves which is converted to heat. This method of UHF curing is applicable to the fabrication of a continuous-length cured silicone rubber body at a low cost by continuously extruding the composition out of an extruder machine and introducing the extruded body into a UHF-curing oven or microwave oven in which the silicone rubber composition is exposed to microwaves.

The production line of a continuous-length cured silicone rubber body from the inventive composition may consist of an extruder machine of, for example, a vent type, UHF-curing oven, oven for secondary curing and take-up machine. Namely, the silicone rubber composition is introduced into the extruder machine and continuously extruded therefrom to have a desired cross section. The continuous-length body extruded out of the extruder machine is then introduced into the UHF-curing oven equipped with a high-frequency oscillator generating microwaves at a frequency of $2450 \pm 50$ MHz or $915 \pm 25$ MHz. The power output of the high-frequency oscillator should be strong enough to ensure heating of the silicone rubber body running in the oven up to a temperature of 160° C. or higher so that the organic peroxide contained in the composition as the curing agent is decomposed to exhibit crosslinking activity. It is sometimes advantageous that the UHF-curing oven is further provided with an auxiliary heating means such as an infrared radiation heater or hot-air circulator so as to ensure more rapid temperature increase of the silicone rubber body. The continuous-length silicone rubber body coming out of the UHF-curing oven has been fully cured provided that the heating schedule in the UHF-curing oven is appropriate. It is, however, advantageous that the continuous-length silicone rubber body coming out of the UHF-curing oven is further introduced into an oven for secondary curing by a known method such as normal-pressure hot-air vulcanization and fluidized-bed vulcanization. Besides the effect of perfecting curing of the silicone rubber, heating for the secondary curing has another advantage that the decomposition product of the curing agent and the like formed in the step of the UHF curing can be removed by dissipation so that the cured silicone rubber body obtained thereby can be imparted with increased stability in several properties.

Since the components (a), (b) and (d) in the inventive silicone rubber composition are each rather conventional as is mentioned before and the component (c) has no adverse influences on the properties of the silicone rubber as cured, the cured silicone rubber article obtained from the inventive composition possesses all of the excellent properties inherent in conventional silicone rubbers in general such as high heat and cold resistance, weatherability and electric properties as well as low permanent compression set in the recovery from compression. In addition, the crosslinking reaction in the UHF curing proceeds not only from the surface layer of the body but also evenly throughout the cross section of the body so that a possibility is given for a high-speed curing process by increasing the output power of the UHF-curing oven. Therefore, the inventive silicone rubber composition is useful in the preparation of a continuous-length cured silicone rubber body having a large thickness such as gaskets in buildings, rubber tubes, rollers and the like.

In the following, descriptions are given for the preparation procedure of the specific polyorganosilsesquioxane and silica powders used as the component (c) in the inventive composition which is illustrated in more detail by way of examples and comparative examples. In the following description, the term of "parts" always refers to "parts by weight".

Preparation of Polyorganosilsesquioxane A.

A mixture of 21.7 g of 2-cyanoethyl triethoxy silane and 122.4 g of methyl trimethoxy silane was gradually added dropwise at a temperature of 10° to 40° C. to an aqueous alkaline solution prepared by mixing 20 g of a 28% ammonia water and 1000 g of water to effect co-hydrolysis of the silane compounds followed by the condensation reaction to form precipitates which were collected by filtration, dried and disintegrated to give 67 g (66% of the theoretical value) of fine spherical particles having an average particle diameter of 1.2 $\mu$m. This polyorganosilsesquioxane powder, referred to as the Silsesquioxane A hereinbelow, contained 6.6% by weight of the 2-cyanoethyl groups.

Preparation of Polyorganosilsesquioxane B.

The procedure was about the same as in the preparation of the Silsesquioxane A described above. Thus, a mixture of 26.0 g of 3,3,3-trifluoropropyl triethoxy silane and 122.4 g of methyl trimethoxy silane was gradually added dropwise to an aqueous alkaline solution to effect co-hydrolysis of the silane compounds followed by the condensation reaction to form precipitates which were collected by filtration, dried and disintegrated to give 72 g (70% of the theoretical value) of fine spherical particles having an average particle diameter of 1.8 $\mu$m. This polyorganosilsesquioxane powder, referred to as the Silsesquioxane B hereinbelow, contained 11.4% by weight of the 3,3,3-trifluoropropyl groups.

Preparation of Polyorganosilsesquioxane C.

The procedure was about the same as in the preparation of the Silsesquioxane A described above. Thus, a mixture of 173.6 g of 2-cyanoethyl triethoxy silane and 27.2 g of methyl trimethoxy silane was gradually added dropwise to an aqueous alkaline solution to effect cohydrolysis of the silane compounds followed by the condensation reaction to form precipitates which were collected by filtration, dried and disintegrated to give 91 g (60.3% of the theoretical value) of fine spherical particles having an average particle diameter of 3.5 μm. This polyorganosilsesquioxane powder, referred to as the Silsesquioxane C hereinbelow, contained 35.5% by weight of the 2-cyanoethyl groups.

Preparation of Polyorganosilsesquioxanes A-1 to A-3.

Three polyorganosilsesquioxane powders, referred to as the Silsesquioxanes A-1, A-2 and A-3 hereinbelow, were prepared each in substantially the same manner as in the preparation of the Silsesquioxane A described above except that the molar ratio of the 2-cyanoethyl triethoxy silane and methyl trimethoxy silane, which ratio was 10:90 in the Silsesquioxane A, was varied to 25:75, 50:50 or 80:20, respectively.

Preparation of Silica A.

A 2-cyanoethyl group-containing silica powder, referred to as the Silica A hereinbelow, was prepared in the following manner. Thus, 50 g of a commercially available fumed silica filler having a specific surface area of 200 m$^2$/g were dispersed in 1 liter of toluene contained in a 2-liter flask to form a dispersion to which 20 g of 2-cyanoethyl trimethoxy silane and 0.5 g of ammonium carbonate as a catalyst were added. The mixture in the flask was heated at 100° C. for 2 hours. Thereafter, the mixture was freed from volatile matters including toluene to give a surface-modified silica powder which contained 8.5% by weight of the 2-cyanoethyl groups.

EXAMPLE 1 (COMPOSITIONS I TO V)

A base compound was prepared by uniformly blending, on a two-roller mill, 100 parts of a diorganopolysiloxane having an average degree of polymerization of about 8000 and consisting of 99.825% by moles of dimethylsiloxane units, 0.15% by moles of methyl vinyl siloxane units and 0.025% by moles of dimethyl vinyl siloxy units with 3 parts of diphenyl silane diol and 4 parts of a dimethylpolysiloxane fluid having a degree of polymerization of 10 and terminated at the molecular chain ends with silanolic hydroxy groups each as a dispersing aid and 40 parts of a fumed silica filler (Aerosil 200, a product by Nippon Aerosil Co.) followed by a heat treatment of the compound at 150° C. for 4 hours.

A 100 parts portion of the above prepared base compound was taken and blended with 50 parts of the Silsesquioxane A, B or C prepared above together with 1.5 parts of a silicone oil-based paste containing 50% by weight of 2,4-dichlorobenzoyl peroxide to give curable silicone rubber compositions, referred to as the Compositions I, II and III, respectively, hereinbelow.

Each of the Compositions I to III prepared above was shaped into a form of a block having a diameter of 60 mm and a height of 15 mm and exposed to microwaves at a frequency of 2450±50 MHz in a microwave oven of 600 watts output for a length of time up to 3 minutes to effect curing. Table i below shows the temperature increase of the blck as measured at the center thereof during the microwave irradiation, the starting temperature being 25° C. Each of the compositions after 3 minutes of microwave irradiation was found to be fully cured. The cured silicone rubbers were each in a milky white color with a possibility of coloring in any desired color.

For comparison, two more silicone rubber compositions, referred to as the Compositions IV and V hereinbelow, were prepared in the same manner as above excepting omission of the polyorganosilsesquioxane in the Composition IV and replacement of the polyorganosilsesquioxane with the same amount of black iron oxide (KN-320, a product by Toda Kogyo Co.) in the Composition V. The Composition IV was colored in milky white leaving a possibility of free coloring but curing of the composition by the microwave irradiation was incomplete. On the other hand, curing of the Composition V by the microwave irradiation was complete but the composition was colored in black so that the composition could not be colored in a lighter color than black. The temperature increase in these comparative compositions during the microwave irradiation is also shown in Table 1.

TABLE 1

| Composition No. | Temperature during UHF irradiation, °C. | | | | |
|---|---|---|---|---|---|
| | I | II | III | IV | V |
| After 30 seconds | 70 | 50 | 140 | 30 | 138 |
| After 1 minute | 98 | 77 | 205 | 39 | 200 |
| After 2 minutes | 123 | 103 | 231 | 52 | 230 |
| After 3 minutes | 155 | 120 | 251 | 70 | 253 |

EXAMPLE 2 (COMPOSITIONS VI TO X)

Three curable silicone rubber compositions, referred to as the Compositions VI, VII and VIII hereinbelow, were prepared each by uniformly blending, on a two-roller mill, 100 parts of the base compound prepared in the preceding example with the Silsesquioxane A in an amount of 10, 50 or 100 parts, respectively, and 1.5 parts of the same peroxide paste as used in the preceding example.

Each of the compositions was supplied to an extruder machine having a cylinder of 40 mm diameter with a L/D value of 12 and extruded out of a circular die of 15 mm diameter at a temperature of 15° to 30° C. into a continuous-length rod of the rubber composition. The thus molded rod of the silicone rubber composition was transferred at a velocity of 1.5 meters per minute through a microwave oven of a 1 kilowatt output having a 1.5 meter long irradiation zone and working at a frequency of 2450±50 MHz. The atmosphere of the irradiation zone of the microwave oven was kept at 150° C. by circulating hot air during the irradiation.

Each of the compositions had good moldability by extrusion although the moldability of the Composition VIII was slightly poor as compared with the other two compositions. Curing of the rubber composition was complete in each of the Compositions VI, VII and VIII by the microwave irradiation.

For comparison, two more silicone rubber compositions, referred to as the Compositions IX and X hereinbelow, were prepared and tested in the same manner as above except that the Silsesquioxane A was omitted in the Composition IX and the amount thereof was increased to 310 parts in the Composition X. The result of the microwave irradiation of the Composition IX was that curing was somewhat incomplete. No rod-shaped form could be extrusion-molded from the Composition X due to the poor moldability of the composition.

EXAMPLE 3 (COMPOSITIONS XI TO XIV)

Three foamable silicone rubber compositions, referred to as the Compositions XI, XII and XIII hereinbelow, were prepared each by uniformly blending, on a two-roller mill, 100 parts of the base compound prepared in Example 1 with 50 parts of the Silsesquioxanes A, B and C, respectively, together with 2.5 parts of azobisisobutyronitrile as a blowing agent, 0.5 part of a silicone oil paste containing 50% by weight of 2,4-dichlorobenzoyl peroxide and 1.5 parts of dicumyl peroxide.

Each of the foamable compositions was supplied to the same extruder machine as used in the preceding example but equipped with an annular die having an outer diameter of 20 mm and an inner diameter of 10 mm and extruded at 15° to 30° C. into a tubular form of 20 mm outer diameter and 10 mm inner diameter. The thus molded tubular form of the composition was subjected to UHF curing in just the same manner as in the preceding example except that the UHF power output was 2 kilowatts and the temperature of the air circulating through the irradiation zone was 130° C. instead of 150° C.

Each of the compositions was completely cured into a tube of foamed silicone rubber having a uniform and fine cellular structure with a ratio of expansion of 302%, 368% and 352% for the Compositions XI, XII and XIII, respectively.

For comparison, the same experiment as above was repeated with another composition, referred to as the Composition XIV, prepared in the same formulation as above excepting omission of the polyorganosilsesquioxane. The result of UHF curing was that curing of the composition was incomplete and the cellular structure of the foamed rubber was coarser and less uniform than in the cured silicone rubber bodies of the Compositions XI to XIII with a ratio of expansion of 135%.

EXAMPLE 4 (COMPOSITIONS XV TO XXI)

Six foamable silicone rubber compositions, referred to as the Compositions XV to XX hereinbelow, were prepared each in the same manner as in the preceding example except that the polyorganosilsesquioxanes and the amounts thereof added to the respective compositions were:

10 parts of Silsesquioxane A in the Composition XV;
50 parts of Silsesquioxane A in the Composition XVI;
100 parts of Silsesquioxane A in the Composition XVII;
50 parts of Silsesquioxane A-1 in the Composition XVIII;
50 parts of Silsesquioxane A-2 in the Composition XIX;
and
50 parts of Silsesquioxane A-3 in the Composition XX.

The results of the UHF curing test performed in the same manner as in the preceding example were that curing was complete and the cellular structure of the foamed silicone rubber tube was fine and uniform in each of the compositions with ratios of expansion of 270%, 353%, 200%, 367%, 375% and 410%, respectively.

For comparison, the same experiment as above was repeated with another composition, referred to as the Composition XXI, prepared in the same formulation as in the Composition XV except that the amount of the Silsesquioxane A was 5 parts. The result of the UHF curing was that curing of the composition was incomplete and the cellular structure of the foamed rubber body was coarser and less uniform than in the cured silicone rubber bodies of the Compositions XV to XX with a ratio of expansion of 133%.

EXAMPLE 5 (COMPOSITIONS XXII TO XXIV)

A base compound was prepared by uniformly blending, on a two-roller mill, 100 parts of the same gum-like organopolysiloxane as used in Example 1, 4 parts of the same silanol-terminated dimethylpolysiloxane as used in Example 1, 10 parts of a fumed silica filler (Aerosil 200, a product by Nippon Aerosil Co.) and 35 parts of the Silica A followed by a heat treatment of the compound at 150° C. for 4 hours. A 100 parts portion of this base compound was taken and admixed with 1.5 parts of a silicone oil paste containing 50% by weight of 2,4-dichlorobenzoyl peroxide.

One of the thus prepared three portions of the curable silicone rubber composition, referred to as the Composition XXII hereinbelow, was subjected to the UHF curing test in the same manner as in Example 1. The other two of the thus prepared three portions were each further admixed with 0.5 part of ultramarine or Titan Yellow as a pigment to give colored compositions, referred to as the Compositions XXIII and XXIV, respectively, which were then subjected to the same UHF curing test. Each of these three compositions had good curability by the microwave irradiation for 3 minutes. The cured silicone rubber obtained from the Composition XXII was milky white in color while those obtained from the Compositions XXIII and XXIV were in bright blue and yellow, respectively. Table 2 below shows the temperature increase in these three compositions during the microwave irradiation measured in the same manner as in Example, 1.

TABLE 2

| Composition No. | Temperature during UHF irradiation, °C. | | |
|---|---|---|---|
| | XXII | XXIII | XXIV |
| After 30 seconds | 57 | 60 | 59 |
| After 1 minute | 73 | 75 | 73 |
| After 2 minutes | 98 | 102 | 100 |
| After 3 minutes | 131 | 135 | 132 |

What is claimed is:

1. A silicone rubber composition curable by irradiation with high-frequency electromagnetic waves which comprise, as a uniform blend:

(a) 100 parts by weight of a diorganopolysiloxane represented by the average unit formula $$R_a SiO_{(4-a)/2},$$

in which R is an unsubstituted or substituted monovalent hydrocarbon group having 1 to 10 carbon atoms and a is a positive number in the range from 1.95 to 2.05, and having an average degree of polymerization in the range from 3,000 to 30,000;

(b) from 10 to 300 parts by weight of an unmodified finely divided silica filler substantially having a chemical formula of $SiO_2$;

(c) from 25 to 100 parts by weight of an organic-modified silica or polyorganosilsesquioxane powder each having cyanoalkyl functional organic groups bonded to the silicon atoms, the content of the functional organic groups being at least 0.3% by weight in the silica or polyorganosilsesquioxane powder; and (d) an organic peroxide curing agent in an amount sufficient to cure the composition when the composition is heated.

2. The silicone rubber composition curable by irradiation with high-frequency electromagnetic waves as claimed in claim 1 in which the component (c) is a polyorganosilsesquioxane powder having functional organic groups bonded to the silicon atoms.

3. The silicone rubber composition curable by irradiation with high-frequency electromagnetic waves as claimed in claim 1 in which the cyanoalkyl group is a 2-cyanoethyl group.

4. The silicone rubber composition as claimed in claim 1 in which the diorganopolysiloxane as the component (a) has an average degree of polymerization in the range from 4,000 to 10,000.

5. The silicone rubber composition as claimed in claim 1 in which the finely divided silica filler as the component (b) has a specific surface area of at least 50 $m^2/g$.

6. The silicone rubber composition as claimed in claim 1 in which the amount of the finely divided silica filler as the component (b) is in the range from 25 to 200 parts by weight per 100 parts by weight of the component (a).

7. The silicone rubber composition as claimed in claim 2 in which the polyorganosilsesquioxane powder has an average particle diameter in the range from 0.1 to 50 $\mu m$.

8. The silicone rubber composition as claimed in claim 1 in which the amount of the organic peroxide is in the range from 0.5 to 5 parts by weight per 100 parts by weight of the component (a).

9. A method for the preparation of a cured silicone rubber article which comprises:

(A) compounding into a uniform composition, (a) 100 parts by weight of a diorganopolysiloxane represented by the average unit formula

$$R_a SiO_{(4-a)/2},$$

in which R is an unsubstituted or substituted monovalent hydrocarbon group having 1 to 10 carbon atoms and a is a positive number in the range from 1.95 to 2.05, and having an average degree of polymerization in the range from 3,000 to 30,000;

(b) from 10 to 300 parts by weight of a finely divided silica filler substantially having a chemical formula of $SiO_2$;

(c) from 10 to 200 parts by weight of an organic-modified silica or polyorganosilsesquioxane powder having cyanoalkyl functional organic groups bonded to the silicon atoms, the content of the functional organic groups being at least 0.3% by weight in the silica or polyorganosilsesquioxane powder; and (d) an organic peroxide curing agent in an amount sufficient to cure the composition when the composition is heated;

(B) shaping the composition into a form; and (C) exposing the shaped form to ultrahigh frequency electromagnetic waves having a frequency in the range from 900 MHz to 5000 MHz.

10. A cured silicone rubber article prepared by the method of claim 9.

11. A silicone rubber article curable by irradiation with high-frequency waves as claimed in claim 9 in which the component (c) is a polyorganosilsesquioxane powder having functional organic groups bonded to the silicon atoms.

12. A silicon rubber article curable by irradiation with high-frequency electromagnetic waves as claims in claim 9 in which the cyanoalkyl group is a 2-cyanoethyl group.

13. A silicone rubber article as claimed in claim 9 in which the diorganopolysiloxane as the component (a) has an average degree of polymerization in the range from 4,000 to 10,000.

14. A silicone rubber article as claimed in claim 9 in which the finely divided silica filler as the component (b) has a specific surface area of at least 50 $m^2/g$.

15. A silicone rubber article as claimed in claim 9 in which the amount of finely divided silica filler as the component (b) is in the range from 25 to 200 parts by weight per 100 parts by weight of the component (a).

16. A silicone rubber article as claimed in claim 9 in which the polyorganosilsesquioxane powder has an average particle diameter in the range form 0.1 to 50 $\mu m$.

17. A silicone rubber article as claimed in claim 9 in which the amount of the component (c) is in the range from 25 to 100 parts by weight per 100 parts by weight of the component (a).

18. A silicone rubber article as claimed in claim 9 in which the component (d) is an organic peroxide.

19. A silicone rubber article as claimed in claim 9 in which the amount of the organic peroxide is in the range from 0.5 to 5 parts by weight per 100 parts by weight of the component (a).

20. The silicone rubber composition as claimed in claim 1 in which component (c) is an organic-modified silica powder having functional organic groups bonded to the silicon atoms.

21. A silicone rubber article as claimed in claim 20 in which the organic-modified silica powder has an average particle diameter in the range from 0.1 to 50 $\mu m$.

* * * * *